May 5, 1925.
G. A. FOISY
1,536,090
METHOD AND APPARATUS FOR TESTING TUBES AND OTHER HOLLOW ARTICLES
Filed June 25, 1921
3 Sheets-Sheet 2
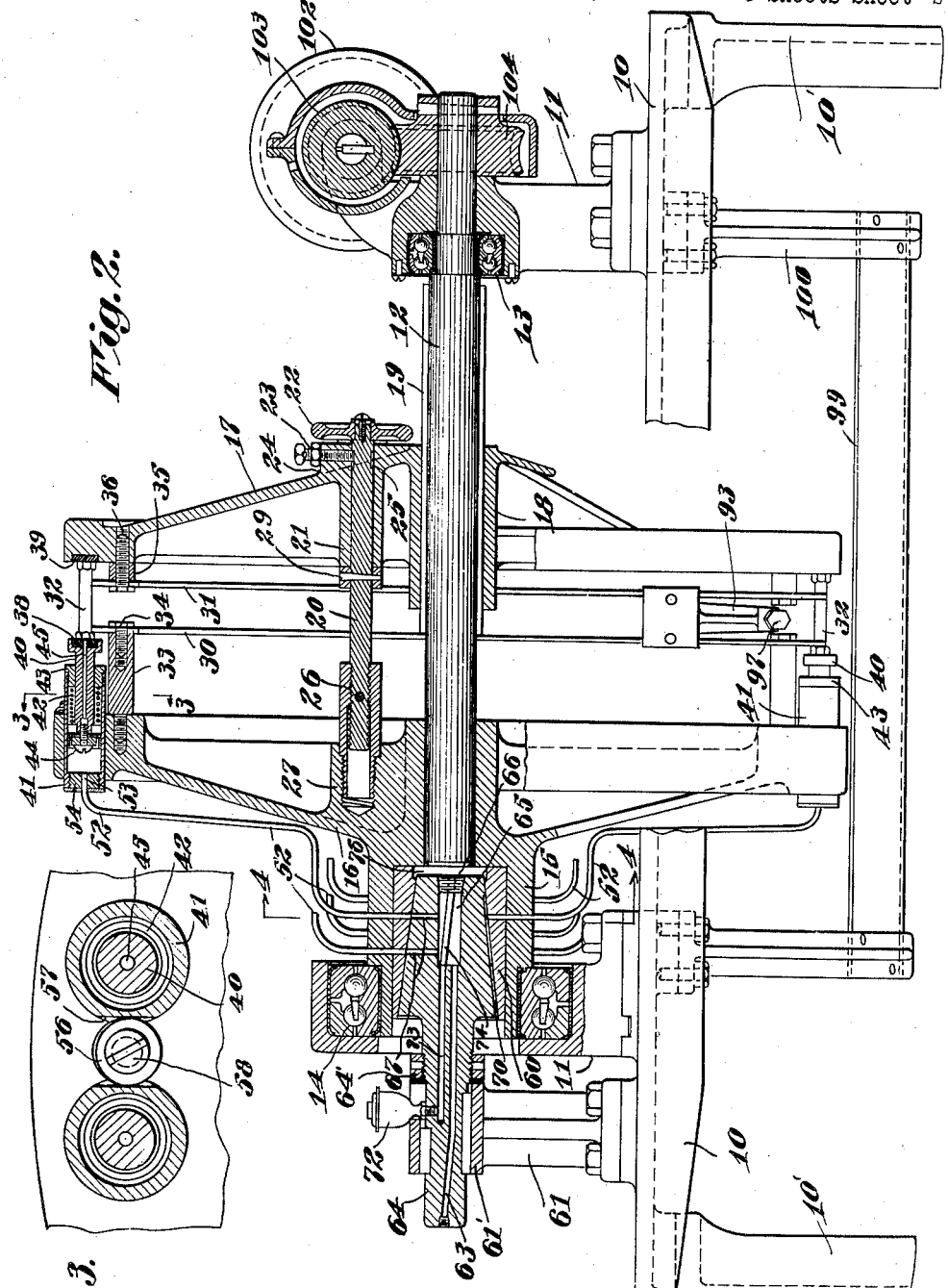

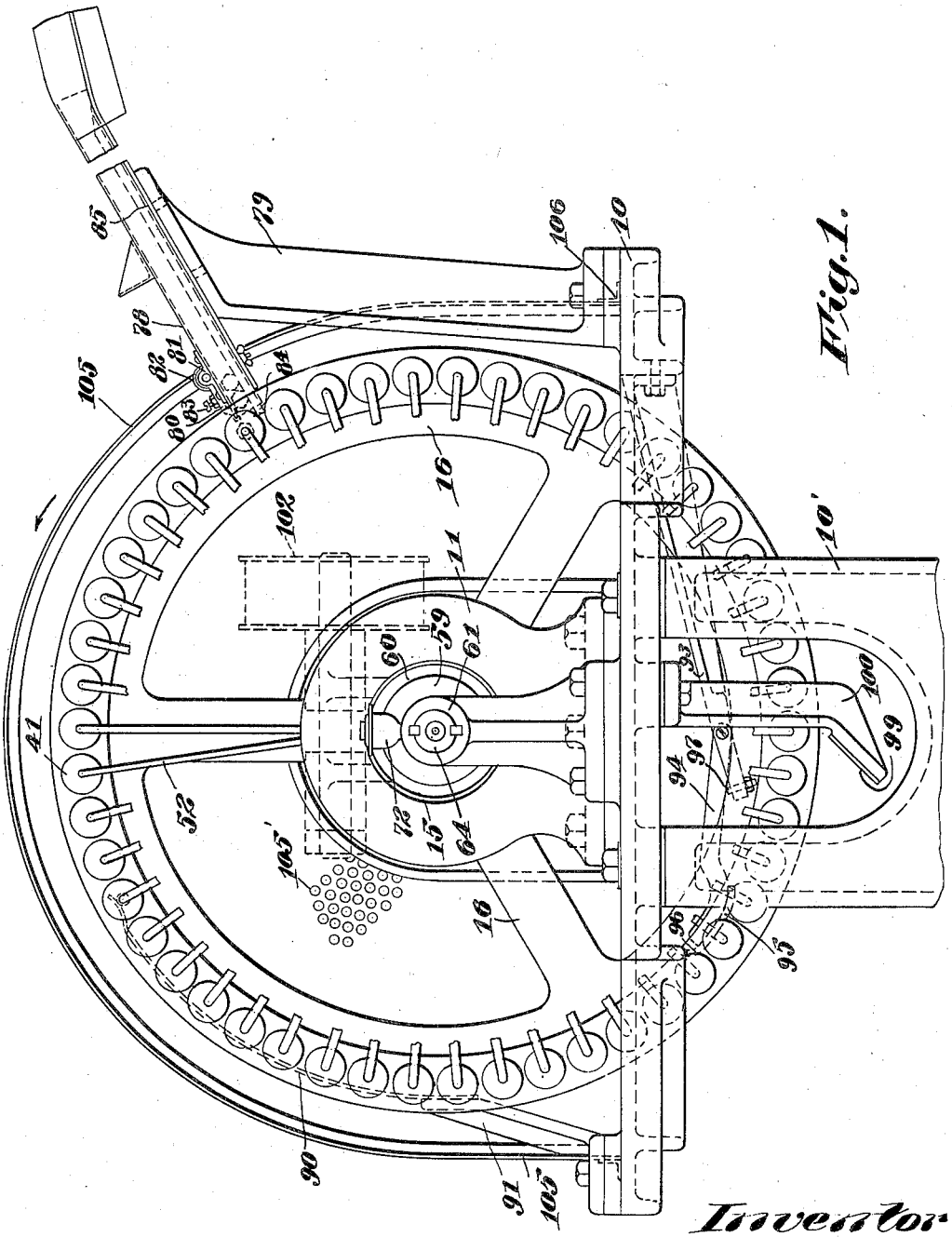

May 5, 1925. 1,536,090
G. A. FOISY
METHOD AND APPARATUS FOR TESTING TUBES AND OTHER HOLLOW ARTICLES
Filed June 25, 1921 3 Sheets-Sheet 3
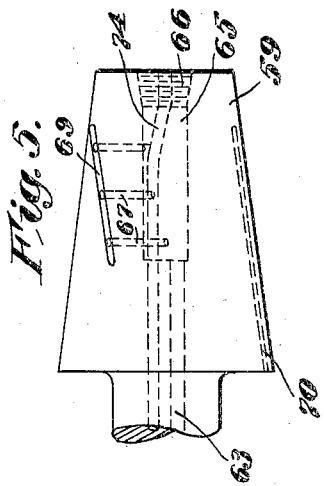
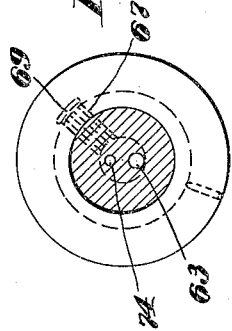
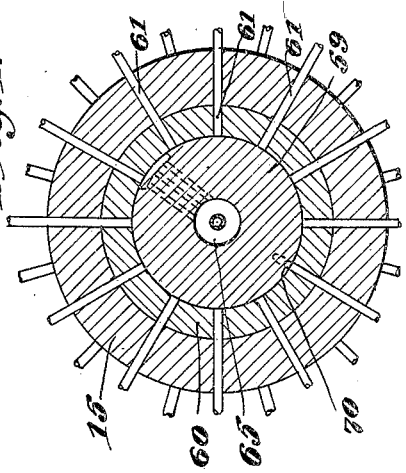
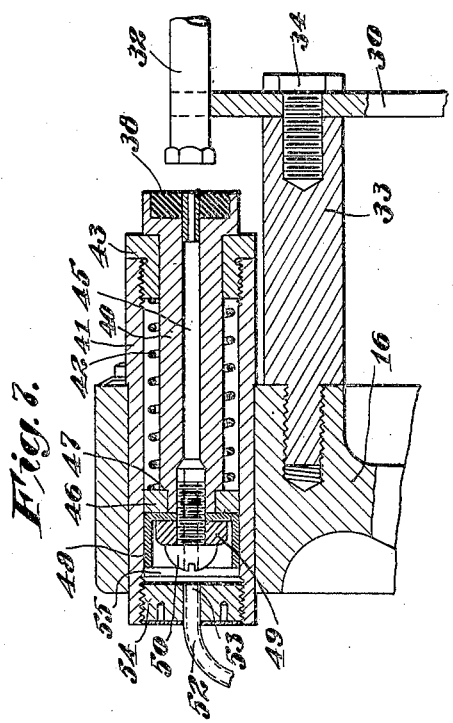
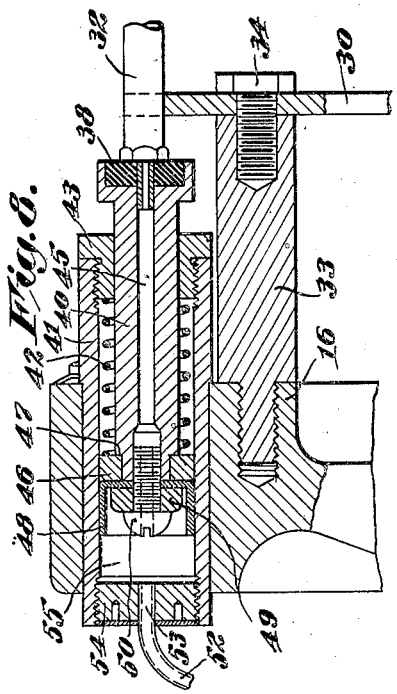
Inventor
George A. Foisy
by Roberts, Roberts & Cushman
his Attorneys Patented May 5, 1925.

1,536,090

UNITED STATES PATENT OFFICE.

GEORGE A. FOISY, OF LOWELL, MASSACHUSETTS, ASSIGNOR TO UNITED STATES CARTRIDGE COMPANY, OF LOWELL, MASSACHUSETTS, A CORPORATION OF MASSACHUSETTS.

METHOD AND APPARATUS FOR TESTING TUBES AND OTHER HOLLOW ARTICLES.

Application filed June 25, 1921. Serial No. 480,432.

*To all whom it may concern:*

Be it known that I, GEORGE A. FOISY, a citizen of the United States of America, and resident of Lowell, in the county of Middlesex and State of Massachusetts, have invented new and useful Improvements in Methods and Apparatus for Testing Tubes and Other Hollow Articles, of which the following is a specification.

This invention relates to a new and improved method and apparatus for automatically testing hollow articles such as tubes and the like to determine whether defective, by reason of cracks or other defects therein.

The specific apparatus shown herein, typifying the genus by which the method is practiced, is particularly applicable for use in testing tubes which have been extruded and shaped prior to the assembly thereof in a completed structure such as a radiator. In the course of the formation of the tube, it is subjected to various strains and stresses which occasionally cause ruptures or cracks in the material. It is therefore desirable to test the individual tubes in order to determine which ones are defective before the tubes are placed in an assembled structure. As the number of tubes employed is very large the testing method and apparatus employed should be such as to handle the tubes expeditiously. It is also desirable that the method and apparatus employed be such as will minimize the necessity for the use of the senses of the operator. In certain methods of inspection the sense of sight is depended upon for locating defects in the article, but this is not altogether satisfactory because the fracture may be so small as not to be readily seen. It is therefore desirable to provide means for automatically separating the defective articles from perfect ones by minimizing the use of observation and judgment on the part of the operator.

One of the objects of this invention is to provide a new and improved method and apparatus for testing hollow articles such as tubes or the like so as to automatically separate from the perfect articles the articles which are defective by reason of fractures or openings, the said process and method being such as will obviate the difficulties and objections above noted.

Other objects of this invention are to provide a method of testing tubes or the like whereby defective tubes may be automatically separated from perfect tubes without requiring the judgment or sight of an operator, to provide apparatus for testing tubes or the like which is automatic and continuous in operation, which enables the testing to be expeditiously accomplished, which automatically separates the defective articles from the perfect articles and deposits each at separate points, which is simple in operation and of rugged construction, which may be employed for testing tubes of different shape and size, which does not require the service of a skilled operator, and which will remove articles which are accidentally retained in the apparatus.

In general the invention involves subjecting hollow articles to a different means of support during a certain period, the supporting means functioning successively and independently of each other, one of said supporting means being dependent upon and responsive to a certain fluid pressure maintained within the hollow article being tested for supporting said article, so that if the article is defective by reason of fractures or apertures the pressure responsive holding means will no longer function to support the article but will permit the defective article to drop at a different point from that at which a perfect article is deposited.

In order clearly to set forth the nature of the invention, I have illustrated one concrete embodiment in the accompanying drawings, in which—

Fig. 1 is an end elevation of the apparatus;

Fig. 2 is a vertical longitudinal section of the apparatus;

Fig. 3 is a section on line 3—3 of Fig. 2;

Fig. 4 is a section on line 4—4 of Fig. 2;

Fig. 5 is an enlarged detail of a rotary cone for controlling the fluid pressure;

Fig. 6 is an end elevation of Fig. 5;

Fig. 7 is a section of the yielding pressure responsive supporting means, showing the position of the parts before pressure is applied; and Fig. 8 is a view similar to Fig. 7 but showing the position of the parts occupied when pressure is applied for holding an article.

The particular embodiment of the invention chosen for the purpose of illustration comprises in general a carrier adapted to receive and support the tubes, means to automatically feed the tubes to the carrier, the carrier serving to position and support the tubes for a certain period, auxiliary or supplemental positioning or supporting means cooperating to seal the tube ends and to support the same independently of the carrier for a certain period, the auxiliary means being responsive to fluid pressure within the tube and dependent upon the maintenance of said pressure for holding the tube in position on the carrier, whereby if the tube is defective, as for example as by reason of cracks or apertures therein, the auxiliary holding means will fail to properly support the same and permit the defective tube to be prematurely dropped or ejected from the apparatus. Guards and knock-out mechanism may be provided to insure the removal of all defective tubes at a single point, together with suitable controlling means for regulating the air pressure to the pressure responsive auxiliary supporting means to cause said means to initially engage the tube, and to cause the pressure to be released at a point where it is desired to remove the perfect tubes from the apparatus.

The supporting structure, shown more clearly in Figs. 1 and 2, comprises a suitable base plate 10 supported on legs 10' and having upwardly extending standards or bearing posts 11 in which a shaft 12 is rotatably mounted preferably by means of suitable ball bearings 13 and 14, the bearing 13 being interposed between one end of the shaft and one post 11, and the bearing 14 being interposed between the other post 11 and a collar 15 extending from a head 16 fixed to the other end of the shaft. Another head 17, preferably circular in form, is mounted upon the shaft 12, preferably so as to be adjusted longitudinally thereof in order to vary the distance between the two heads 16 and 17 for a purpose hereinafter to be more clearly set forth. The hub 18 of head 17 is provided with keyways adapted to receive the guides 19 extending longitudinally of the shaft 12 whereby relative rotary movement is prevented between the head 17 and the shaft 12 but permitting relative sliding longitudinal movement between the parts. The head 16 is preferably circular in form and corresponds in size to the head 17. Suitable means are provided for varying the distance between the heads 16 and 17 longitudinally of the shaft 12 and for holding the parts in proper adjusted relation. For this purpose a rod 20 is rotatably mounted in a bearing 21 on the head 17, a suitable handle 22 being mounted thereon with which to turn same; suitable lock means, as for example a set screw 23, may be provided for holding the rod 20 in fixed position. The lock screw is threaded in the boss 24 of the head 17, the end of said lock screw threading into a circular groove 25, extending around the shaft 20 adjacent one end thereof. In order to prevent relative longitudinal movement between the head 17 and the rod 20 a collar is pinned to the rod inside the head as shown at 29. The other end of the rod 20 is preferably threaded and is adapted to be received in a sleeve 26 which in turn is threaded in a boss 27 of the head 16, thereby affording a longer range of adjustment.

In order to provide the initial support for a hollow article such for example as a tube 32 between the heads 16 and 17, carriers 30 and 31 are provided, these carriers being circular in form and fixed to the heads 16 and 17 respectively. As shown, the carrier 30 is of less diameter than the head 16, and is spaced from the inner face of the head 16 by pins 33, one end of each pin being threaded in the inner face of the head 16 adjacent the periphery thereof. Screws 34 pass through the carrier 20 and are threaded into the pins 33 for holding the carrier in position. The carrier 31 is fixed to the inner face of the head 17 and is held in proper spaced relation thereto by spacing collars 35, screws 36 passing through the carrier 31 and the spacing collars 35 and being threaded in the head 17 adjacent the periphery. The function of the carriers 30 and 31 is to act as a support for the tubes 32 as they are delivered thereto from automatic feed mechanism hereinafter to be more fully described. The periphery of the carriers 30 and 31 are provided with recesses or seats preferably corresponding to the form of the tube or other article fed thereto.

After the tube (or other hollow article) has been positioned upon the carrier suitable means are provided for supporting the tube independently of the carrier and for subjecting the interior of the tube to fluid pressure either higher or lower than the pressure outside the tube, the arrangement being such that if the tube is leaky it will be automatically separated from other tubes which are not defective. In the particular embodiment shown for purposes of explanation, the automatic separation of the defective tubes is effected by providing a supplemental supporting means which is responsive to and dependent upon pressure maintained in the hollow article for a certain period whereby if the article is defective the pressure will be reduced or lost and so permit the tube to be prematurely released at a point other than that at which perfect tubes are normally delivered.

The supporting means comprises in general a plurality of relatively movable seats 38 and 39 adapted to engage opposite ends of a tube 32 and seal the ends thereof. The seats 38 and 39 are disposed in a circular series upon the face of the heads 16 and 17, it being understood that any desirable number of supporting devices may be employed. The seats are formed of a yielding material, such for example as rubber, which will engage the edges of the tubes so as to form substantially air-tight seals. The seats 39 are set within recesses in the inner face of the head 17, the face of the seat preferably being flush with the face of the head so that the tubes may freely drop from the head at the proper time. The seats 38 are adjustably mounted in the head 16 so as to be movable relative to the seats 39, and are urged outwardly from contact with the tubes 32 by springs 42. In cooperative relation to the seats 38 are arranged means which renders the support responsive to and dependent upon pressure maintained in the tube 32. As shown there is preferably employed for this purpose a plunger 40 adapted to be reciprocated in a suitable cylindrical casing 41 removably fixed in the head 16, the spring 42 being interposed between the head 43 and the plunger piston 44. However, it is to be understood that any other suitable arrangement of parts, and provision of equivalent pressure responsive means may be employed for effecting relative movement between the seats 28 and 39.

In order to afford access to the interior of the tube 32 so as to subject opposite sides of the wall of the tube to a difference of pressure, a passage 45 is formed in the plunger, the passage connecting the interior of the cylinder with the interior of the tube. As shown more clearly in Figs. 7 and 8, the plunger piston includes a washer 46 which abuts against a shoulder 47 at the inner end of the plunger and a cup-shaped washer 48 preferably composed of leather or other suitable material adapted to form a substantially air-tight contact with the walls of the cylinder 41 as the plunger is reciprocated therein. The cup-shaped washer is retained in position by a nut 49 and screw 50 threaded in the inner end of the plunger. The passage 45 extends through the screw 50 so as to permit ingress or egress of air to or from the article being tested. A tube 52 communicates with the port 53 formed in the head 54 at the other end of the cylinder. When air pressure is admitted to the cylinder chamber 55 through the port 53 the plunger 40 will be forced outward against the resilient action of the spring 42 until the face of the seat 38 is in contact with the end of the tube 32, the seat 38 forming a substantially air-tight connection with the tube. The opposite end of the tube will be forced into contact with the seat 39 in order to effect a substantially air-tight joint. Thus opposite sides of the tube will be subjected to a difference of pressure, which pressure will be maintained for a certain period provided the wall of the tube is not defective.

The cylinder casing 41 may be normally fixed in the head in any suitable manner. As shown more clearly in Fig. 3, the cylinder 41 is provided with a shoulder which abuts against the face of the head 16; the cylinder is retained in position by a washer 56 which engages a notch 57 in the cylinder 41, the washer 56 being retained in position by a screw 58 threaded in the head between the cylinders so that one washer holds a plurality of cylinders. Other suitable means may be used however, for retaining the cylinder in position.

The pressure regulating mechanism for controlling the pressure in the tubes should be of such character as to automatically subject the article to pressure for a certain period, and to break or release the pressure at the end of the period in order to release the article from the pressure responsive supporting means. Various means may be employed for this purpose, but in the form shown there is employed an air valve mechanism comprising a stationary member 59 having an air chamber 65 (Figs. 2 and 4 to 6), to which air pressure is supplied, and a movable bushing or sleeve 60 having suitable passages therein and rotatable with the head 16. As shown, the stationary member 59 is frustro-conical and is mounted in a standard secured to the base 10. The bushing 60 is fixed within the collar 15 and has a frustro-conical seat adapted to receive the member 59. The collar 15 and bushing 60 are provided with radially extending passages 67 adapted to receive one end of the tubes 52 which communicate with the cylinders of the pressure responsive supporting devices, the passages 67 corresponding in number to the number of cylinders supported by the head 15 (50 in the illustration). In order to accommodate such a large number of passages in a valve seat of relatively small diameter, the passages are formed in a number of planes offset longitudinally of the axis. The member 59 is provided with an inlet passage 63 extending inwardly from the end of the core 64 and opening into the chamber 65, one end of chamber 65 being closed by a removable plug 66. As shown in Figs. 5, 6 and 7, the member 59 is provided on its outer periphery with a groove 69 which communicates with the interior chamber 65 through radial ducts 67 and which successively communicates with the inner ends of ducts 52 as the heads rotate, thereby momentarily applying pressure to the tube-holding plunger in succession. After the groove passes a particular duct 52 the air is cut off and the air in the duct 52 and corresponding cylinder and tube is trapped, thereby maintaining the plunger advanced into tube-holding position unless the tube leaks. The member 59 is provided on its opposite side with another groove 70 which communicates with the atmosphere at the larger end of the valve. When the ducts 52 successively come into communication with the groove 70 the air trapped in the cylinders and tubes is exhausted and the plungers are then retracted by the springs 42, thereby releasing the tubes and permitting them to drop from the machine.

The inlet groove 69 is located so that air is admitted to the cylinders shortly after the cylinders pass the feed-chute hereinafter described, the cylinders traveling counter-clockwise as indicated by the arrow in Fig. 1, and the exhaust groove 70 is located so that the tubes are released and dropped when at the bottom of their orbit, i. e., approximately beneath shaft 64.

In order to provide lubrication between the contact bearing surfaces of the member 59 and the bushing 60, an oil cup 72 is mounted in the core 64, said cup communicating with a passage 73 extending longitudinally thereof. The oil is conducted from the passage 73 by means of the tube 74, through the plug 66 to the chamber 76 from which the oil finds its way to the bearing surfaces. It is to be noted that by conducting the oil from the passage 73 through the tube 74 and the plug 66 to the chamber 76 the air pressure in the chamber 65 is not transmitted to the oil in the system.

The core 64 is adjustable axially of the bearing so as to permit the surface of the frustro-conical member 59 to be brought into close engagement with the surface of the bushing to form an air tight seal therewith. A further advantage of axial adjustment of the core 64 is that it compensates for wear between the contacting surfaces. Various means may be employed for effecting the axial adjustment of the core 64. As shown in Fig. 2, the portion of the core 64 between the bearing post 61 and the standard 11 is threaded and is adapted to receive a nut 64′, and a washer preferably of fiber is inserted between the bearing 61′ and the nut 64′. The character of the contact between the bearing surfaces of the member 59 and the bushing 60 may be controlled by rotating the nut in one direction or the other which will cause the member 59 to be moved axially in either direction depending upon the direction in which the nut is rotated. The nut may be provided with radially extending apertures in which a lock screw may be threaded.

In order to effect the expeditious automatic testing of the articles, the method employed is preferably continuous in operation, automatic feed mechanism being provided whereby the tubes are fed intermittently one at a time. As shown, the automatic feed mechanism comprises a chute or run 78 supported in an inclined position on a bracket 79 fixed to the base 10 so that the lower open end of the chute lies between the heads 16 and 17 and adjacent to the carriers 30 and 31 whereby the tubes 32 passing from the lower end of the chute 78 may be received upon the seats of the rotating carrier. In order to regulate the movement of the tubes from the chute, a finger 80 is provided adjacent the lower end of the chute and is arranged to yieldingly engage the tubes as they pass therefrom. One end of the finger 80 is pivotally supported on a bracket 81 and a spring 82 interposed between the bracket and the finger to cause the finger to yieldingly engage the tubes. In order to vary the setting of the finger, an adjusting screw 83 may be provided.

In operation, certain of the defective tubes will permit the pressure to be lost sooner or later than others and it is therefore desirable to provide means whereby all the defective tubes will be released from the carrier at a common point. To this end I provide a guard 90 outside of the carrier and adjacent to the tubes, the guard being mounted on base 10 by bracket 91. The guard may extend around the periphery of the carrier for any desired distance and functions to prevent the defective tubes from leaving the carrier until the tubes have been moved beyond the lower end of the guard.

During the normal operation of the pressure responsive means, it may sometimes happen that the seats 38 and 39 of the supporting means will engage projecting or irregular portions of the edges of the tubes which will have a tendency to cause the tubes to be stuck or accidentally retained by the pressure responsive supporting means even after the release of the pressure therein. It is desirable therefore to provide a knock-out means for subjecting the tubes to a slight force sufficient to dislodge tubes which may be so accidentally retained. As shown more clearly in Fig. 1, a knock-out bracket 93 is mounted on the base 10, and a knock-out arm 94 is pivoted at one end thereof, the said arm having a shoe 95 fixed to the other end thereof, one end of the knock-out shoe 96 being preferably curved and so positioned as to cause the shoe to ride upon the tubes as they are moved thereunder. As the shoe 95 rides upon the tubes, the tubes will be subjected to a certain pressure or force which in the present instance will be that due to the weight of the arm acting thereon. The force will be sufficient to dislodge defective tubes which have been retained accidentally in the pressure responsive supporting means, but will not be sufficient to dislodge the perfect tubes which are retained in the pressure responsive supporting means by reason of the pressure maintained therein. An adjusting means such as a screw 97 may be arranged at the end of the knock-out bracket 93 so as to adjust the position of the knock-out arm 94. A guard 99 supported from frame 10 by brackets 100 may be arranged for diverting defective tubes from the perfect tubes as they fall from the carrier The right-hand end (Fig. 1) of the knock-out bracket crosses the path of the tubes and thereby serves to dislodge any perfect tubes that may stick to the seats 38 and 39.

In order to effect rotation of the heads 16 and 17, any suitable means may be provided for driving the shaft 12 upon which the heads are mounted. As shown in Fig. 2, the shaft 12 is driven by a pulley 102 through a worm 103 and worm wheel 104 mounted on the shaft. If desired, the entire apparatus may be covered by a semicircular guard 105 having apertures 105′ therein, which guard as shown is secured to the base 10 by means of angle irons 106.

In operation, assuming that the carrier heads 16 and 17 are rotating counter-clockwise, the tubes will be picked up successively by the carriers 30 and 31 at the feed-chute 78 and the plungers are successively advanced as the tubes start on their circular travel. If the tubes do not leak the plungers remain advanced until they reach the lowermost position whereupon the trapped air is released and the tubes are dropped. In the case of leaky tubes the air escapes through the tubes more or less shortly after being applied, the plungers are thereupon retracted by springs 42, and the leaky tubes are discharged at or in advance of the knock-out 95.

It is to be noted that the tubes are rotated in a vertical plane, the advantage of such an arrangement being that the tubes can be fed upon the upper side of the rotating member in such a manner that the tubes are retained upon the carrier by gravity for a certain portion of the revolution and that the pressure responsive supporting means engages the tubes while being moved and supported on the carrier. After a certain period or after the carrier has been rotated a certain part of a revolution, the carrier becomes ineffective for retaining the article in position, and the pressure responsive means becomes the sole means of support for the article. In other words, by reason of the relative arrangement of the article upon the carrier, the pressure responsive supporting means and a member rotating in a vertical plane, the sole means of support for the article is automatically transferred from the carrier to the pressure responsive support.

I claim—

1. The method of testing hollow articles having openings therein which comprises subjecting the articles to internal fluid pressure, supporting the articles on a moving carrier by the application of pressure thereto supplied by a fluid communicating with that within the article, trapping the fluid within the articles for a predetermined period, and then relieving the pressure at a predetermined point in the travel of the carrier to release the articles, the pressure within the articles being relieved through the articles during said period if the articles leak, whereby the leaky articles are released before reaching said point.

2. The method of testing a hollow article which consists in subjecting the article to internal fluid pressure, supporting the article in response to pressure within the article, moving said article over a predetermined path, and automatically regulating said pressure while the articles move over said path so that if said article is leaky the same will be prematurely released from said supporting means at a point intermediate the ends of the path.

3. Apparatus for testing hollow articles having openings therein comprising a movable carrier, pressure responsive means for supporting the articles on said carrier, said means being responsive to a difference of pressure between the interior and exterior of the articles, and means for creating said pressure through said openings and then cutting off the supply of fluid pressure while the carrier travels a distance, whereby the difference of pressure is equalized through the articles, if the articles leak, and the articles are automatically released during said travel.

4. In testing apparatus including a rotating carrier adapted to receive articles, supporting means responsive to air pressure adapted to hold the articles in position on the carrier and means for subjecting the article to air pressure, pressure controlling means cooperating with the supporting means automatically to control the air pressure applied to the article, said pressure controlling means including a rotating member having passages communicating with the articles and supporting means, and a stationary member having a passage therein communicating with a source of air pressure and adapted to be brought successively into communication with the passages in the rotating member.

5. Testing apparatus comprising a movable carrier adapted to receive articles and move them in a predetermined path, movable pressure responsive supporting means arranged adjacent the carrier adapted to support an article, and means for simultaneously supplying pressure to said article and said supporting means for holding the article by said pressure responsive supporting means and means for automatically disengaging an article in response to loss of pressure through a leaky tube.

6. Testing apparatus comprising a carrier rotatably mounted having seats adapted to receive tubes thereon and to move them through a predetermined portion of a revolution, pressure responsive supporting means rotatable adjacent the carrier and adapted to support the tubes independently of other supports on said carrier, and means for supplying pressure to the tubes and said pressure responsive supporting means for holding the tube in position, whereby if the tube is defective by reason of openings contained therein the pressure will be reduced and so permit the tube to be prematurely dropped before reaching the end of the portion of the revolution normally traveled by other tubes which are not defective.

7. Testing apparatus comprising rotatable carriers arranged side by side having seats adapted to receive tubes thereon and to support the same for a portion of a revolution, pressure responsive supporting means arranged adjacent said carrier and movable in synchronism therewith, said pressure responsive supporting means being adapted to engage the ends of the tube and to normally support the same for another predetermined portion of a revolution, and means for simultaneously supplying pressure to the tube and said pressure supporting means, said pressure supporting means being dependent upon the maintenance of the pressure in the tubes for supporting the tube throughout the normal path of movement whereby if the walls of the tube are defective by reason of openings contained therein the pressure will be reduced and permit the defective tube to be automatically dropped at a point other than that at which the perfect tubes are deposited.

8. An automatic testing machine adapted to separate defective hollow articles having openings therein from other hollow articles in which the walls are continuous, said machine comprising in combination a continuously moving carrier, adapted to receive the articles and carry the same for a certain distance, means for creating a pressure within said articles, supplemental supporting means arranged adjacent the carrier to subsequently engage said articles and support the same, said supplemental support being responsive to and dependent upon the pressure maintained in said article for holding said article in supported position, whereby if said articles are defective by reason of openings therein such articles will be dropped prematurely.

9. Testing apparatus comprising in combination a carrier having a seat adapted to support an article delivered thereto, means for moving said carrier in a predetermined path of travel, said seat acting as a sole support for the article for a predetermined portion of the total path, a supplemental supporting means arranged adjacent said carrier adapted to engage the article and to support the same for a predetermined portion of the path of travel after the seat has become ineffective to function as the sole support for the article, means for simultaneously subjecting said supplemental support and said article to fluid pressure, said supplemental support being dependent upon the maintenance of pressure within the article for supporting the same after said seat has become ineffective to support the article, whereby if the article is defective by reason of an aperture in the wall thereof said article will be dropped before reaching the end of the predetermined path of travel.

10. In tube testing apparatus the combination of a plurality of spaced heads rotatably mounted for movement in a vertical plane, means for feeding tubes between said heads, pressure responsive means for supporting the tubes, said means including a plurality of relatively movable seats arranged on the respective heads, each of said seats having a flat yielding surface adapted to engage the ends of the tube to form a seal therewith, means for subjecting said tubes and supporting means to internal fluid pressure, said supporting means being dependent upon the maintenance of pressure within the tubes for the support of the tube, whereby if the tube is defective the tube will be released from the rotating head.

11. In tube testing apparatus, the combination of a plurality of spaced heads adapted to be rotated, pressure responsive means movable with the heads and adapted to support a tube for a certain period, means for applying fluid pressure to said tube and supporting means, and means for controlling said application of pressure, said means comprising a plurality of members one of which is movable with the head, said members having cooperating passages adapted to be brought into communication for determining the period during which pressure is applied to the tube.

12. Testing apparatus comprising in combination a carrier rotatable about a horizontal axis and adapted to support an article during the upper part of a revolution, means to subject the article to internal pressure, supporting means dependent upon pressure maintained in the article for support of the article independent of the carrier during the lower part of the revolution, and means for automatically breaking the pressure to the article during the lower part of the revolution, whereby if the article is defective it will be automatically dropped from the carrier before reaching the lower part of the revolution and if the article is not defective it will be dropped at the lower part of the revolution.

13. Testing apparatus comprising a carrier movable in a fixed path and adapted to receive articles, means movable with said carrier for supporting the articles for a certain period independent of the carrier, and means arranged to engage the article to remove the same from the supporting means and carrier if the article is accidentally retained thereon longer than a certain period.

14. Apparatus for testing hollow articles comprising a pressure responsive support adapted to substantially seal an article and having a passage communicating with the article whereby pressure may be applied to said support and article to support the article, and means for subjecting said articles and support to pressure for a certain period, whereby said pressure responsive support will retain a perfect article for a predetermined period but will permit a leaky article to be prematurely released.

15. Testing apparatus adapted to automatically test and separate leaky tubes from perfect tubes, comprising a carrier adapted to receive a plurality of tubes, a pressure responsive support adapted to hold the tubes independently of the carrier, and means for subjecting said support and tubes to internal fluid pressure for a predetermined period and thereafter trapping the contained fluid under pressure for a certain period, whereby defective tubes will be automatically dropped and perfect tubes will be retained by said pressure responsive support until the fluid is released.

16. Testing apparatus comprising in combination means on which an article is adapted to be supported, supplemental supporting means responsive to fluid pressure adapted to support the article independently of said first named means, means for subjecting said supplemental supporting means and the article to fluid pressure for a predetermined period, and means for changing the relative position of the support and article for transferring the support of the article from the first named supporting means to the supplemental supporting means for a period during which the pressure is applied to said article and supplemental holding means, whereby if the article is defective by reason of an opening contained therein the article will be supported by the pressure responsive supplemental support for a relatively short period but if not defective the article will be supported for the longer period during which the article and supplemental support are subjected to pressure.

17. Tube testing apparatus adapted to automatically test and separate open ended tubes defective by reason of apertures contained therein from perfect tubes, said apparatus comprising in combination a carrier adapted to receive tubes fed thereto, a pressure responsive support including relatively movable seats adapted to engage the ends of the tube, one of said seats having a passage therein communicating with the tube, the other seat forming a seal for the other end of the tube, said support being adapted to sustain the tubes independently of the carrier, means for subjecting the tube and support to pressure for a certain period, means for changing the relative position of the carrier and support so that the latter independently supports the tube, whereby the tube will be supported for a predetermined period corresponding to that during which pressure is maintained on the tube if the tube is perfect but will be prematurely released if defective so that the defective tubes are thus automatically separated from perfect tubes.

18. In automatic testing apparatus for articles, the combination of a carrier adapted to support articles thereon by gravity action, a support adapted to retain the articles in position independent of said carrier against the action of gravity, said support being responsive to the condition of the articles, and means cooperating with the carrier and support arranged to change the relative position thereof, whereby the carrier and support function independently and in succession as the sole means of supporting the articles.

19. Testing apparatus for tubes comprising supporting means including a plurality of relatively movable seats adapted to engage opposite ends of a tube, a carrier between the seats having a portion adapted to support the tubes intermediate the ends when the tubes are in one position, means responsive to pressure cooperating with one of the seats of the support to hold the tubes independently of the carrier when in another position, and means for subjecting the tubes to pressure, said supporting means being dependent upon the maintenance of the pressure in the tubes for retaining the tubes in supported position.

20. Apparatus for automatically testing tubes comprising spaced heads adapted to be rotated, relatively movable seats on said heads adapted to engage and seal opposite ends of the tubes, means for temporarily subjecting the tube to fluid pressure, and means responsive to and dependent upon pressure subsequently maintained in the tubes for holding the relatively movable seats in engagement with the ends of the tube for supporting the same.

21. Tube testing apparatus comprising a plurality of spaced heads rotatably mounted, a carrier between the heads for supporting tubes, and means movable with the heads for supporting the tubes independently of the carrier, said means including a pair of seats adapted to engage opposite ends of the tube, one seat being fixed to one of the heads and the other seat being adjustably mounted in the other head, said adjustable seat being responsive to the condition of the tube for supporting or releasing said tube.

22. Tube testing apparatus comprising a plurality of spaced heads rotatably mounted, and means movable with the heads for supporting the tubes, said means including a pair of seats adapted to engage opposite ends of the tube, one seat being fixed to one of the heads and the other seat being adjustably mounted in the other head, means responsive to air pressure controlling the movement of the adjustable seat, means for feeding tubes to said seats, and means responsive to the rotation of said heads for controlling the air pressure.

23. In testing apparatus in which tubes are subjected to air pressure, tube supporting mechanism comprising a pair of seats adapted to engage and seal opposite ends of a tube, means for adjustably supporting one seat, said means including a pressure responsive device, resilient means operative upon decrease of pressure to urge the seat away from the tube, and means associated with said supporting mechanism for first subjecting the tube to fluid pressure and after a predetermined period relieving it of said pressure.

24. In testing apparatus in which tubes are subjected to air pressure, tube supporting mechanism comprising a pair of seats adapted to engage and seal opposite ends of a tube, means for adjustably supporting one seat, said means including a pressure responsive device operative to force the seat into engagement with one end of the tube upon application of air pressure to the pressure responsive device, and means associated with said supporting mechanism for first subjecting the tube to fluid pressure and after a predetermined period relieving it of said pressure.

25. In testing apparatus in which tubes are subject to air pressure, tube supporting mechanism comprising a pair of seats adapted to engage and seal opposite ends of a tube, means for adjustably supporting one seat, said means including a pressure responsive device operative to force the seat into engagement with one end of the tube upon application of pressure to the pressure responsive device, means operative upon the escape of pressure through the tube to force the seat away from the tube and release the same prior to the time of normal release, and means for releasing the tube after a predetermined period.

26. In testing apparatus in which tubes are subjected to air pressure, tube supporting mechanism comprising a pair of seats adapted to engage and seal opposite ends of a tube and means for adjustably supporting one seat, said means including a pressure responsive device comprising a cylinder having an inlet adapted to communicate with a source of pressure and a plunger having a piston on one end reciprocable in the cylinder and a head on the other end adapted to receive the adjustable seat, said plunger having a passage adapted to communicate with the tube when the end thereof is sealed by the adjustable seat, means for relieving the pressure after a predetermined period to release the tube, and means for forcibly ejecting the tube if it is accidentally retained on said seats.

27. In testing apparatus in which tubes are subjected to air pressure, tube supporting mechanism comprising a pair of seats adapted to engage and seal opposite ends of a tube, means for adjustably supporting one seat, said means including a pressure responsive device comprising a cylinder having an inlet adapted to communicate with a source of pressure and a plunger having a piston on one end reciprocable in the cylinder and a head on the other end adapted to receive the adjustable seat, said plunger having a passage adapted to communicate with the tube when the end thereof is sealed by the adjustable seat, whereby the tube is subjected to pressure when the seats seal the ends thereof, means including a spring cooperating with the plunger and cylinder and operative upon failure of pressure to release the tube, and means for automatically relieving the pressure after a predetermined period.

28. In testing apparatus comprising a rotating member adapted to receive articles, means responsive to fluid pressure for retaining the articles in position on the member, pressure control means for releasing the pressure to said pressure responsive means, and knockout means arranged in the path of movement of the article to prevent said article from being accidentally retained in the rotating member after the pressure has been released from the pressure responsive means.

29. Testing apparatus adapted to separate defective from perfect articles comprising pressure responsive means for supporting the article, means for subjecting the article and pressure responsive means to internal fluid pressure, means controlling the pressure for supporting and releasing the article, and knockout mechanism comprising an arm having means adapted to yieldingly engage said article before the pressure is released from the pressure responsive support by the pressure controlling means, whereby if a defective article is accidentally retained said defective article will be removed from the support by the yielding means.

30. Testing apparatus comprising a carrier adapted to receive articles, means on said carrier responsive to the condition of the articles for supporting the latter independently of said carrier, and means adapted to contact said articles in a manner to dislodge them from said first named means if in a leaky condition but not to dislodge them if in a sound condition.

Signed by me at Lowell, Massachusetts, this 23rd day of June 1921.

GEORGE A. FOISY.